(12) United States Patent
Dede et al.

(10) Patent No.: US 11,885,652 B2
(45) Date of Patent: Jan. 30, 2024

(54) SYSTEMS AND METHODS FOR MEASURING LOW SPEED FLUID FLOW

(71) Applicant: Toyota Motor Engineering & Manufacturing North America, Inc., Plano, TX (US)

(72) Inventors: Ercan M. Dede, Ann Arbor, MI (US); Yuqing Zhou, Ann Arbor, MI (US); Feng Zhou, Ann Arbor, MI (US); Danny Lohan, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/519,983

(22) Filed: Nov. 5, 2021

(65) Prior Publication Data
US 2023/0146582 A1    May 11, 2023

(51) Int. Cl.
*G01F 1/36* (2006.01)
*G01F 1/40* (2006.01)
*G01F 1/34* (2006.01)

(52) U.S. Cl.
CPC ............. *G01F 1/363* (2013.01); *G01F 1/34* (2013.01); *G01F 1/40* (2013.01)

(58) Field of Classification Search
CPC ......... G01F 1/34–48; B01L 2300/0861; B01L 2300/0864
See application file for complete search history.

(56) References Cited

U.S. PATENT DOCUMENTS

| | | | |
|---|---|---|---|
| 4,052,843 A * | 10/1977 | Takizawa | F02C 9/32 60/39.281 |
| 6,603,658 B2 | 8/2003 | Manno et al. | |
| 7,490,512 B2 | 2/2009 | Fraden | |
| 9,295,605 B2 * | 3/2016 | Yurko | A61H 1/008 |
| 10,066,977 B2 * | 9/2018 | Hasson | G01P 5/00 |
| 11,027,514 B2 | 6/2021 | Bargatin et al. | |
| 2016/0329192 A1 | 11/2016 | Sieber et al. | |
| 2020/0070167 A1 * | 3/2020 | Raillon | G01N 15/1056 |
| 2020/0139058 A1 | 5/2020 | Longest et al. | |
| 2021/0129141 A1 * | 5/2021 | Sadabadi | B01L 3/502715 |

FOREIGN PATENT DOCUMENTS

| | | | | |
|---|---|---|---|---|
| CN | 101162165 A | | 4/2008 | |
| CN | 108393104 A * | | 8/2018 | ......... B01L 3/50273 |
| CN | 110729525 A | | 1/2020 | |
| WO | WO-2014023940 A1 * | | 2/2014 | ............ G01N 22/00 |
| WO | 2016/135061 A1 | | 9/2016 | |

* cited by examiner

*Primary Examiner* — Justin N Olamit
(74) *Attorney, Agent, or Firm* — Dinsmore & Shohl LLP

(57) ABSTRACT

Disclosed herein are an apparatus and method fluid flow measurements which include a pressure transducer and a flexible tube. The pressure transducer is tuned to measure flow speeds having a Reynolds number less than 100 and include an inlet. The flexible tube has a first end fluidly coupled to the inlet and a second end positioned adjacent to and in fluid communication with a plurality of fluid outlets of a microchannel flow structure. Each of the plurality of fluid outlets has a cross section defining an outlet area. The second end has a cross section defining a flexible tube area that is larger than the outlet area.

8 Claims, 3 Drawing Sheets

SYSTEMS AND METHODS FOR MEASURING LOW SPEED FLUID FLOW

TECHNICAL FIELD

The present specification generally relates to apparatus and methods for measuring low speed fluid flow and, more specifically, apparatus and methods for measuring for low speed fluid flow in microchannel structures.

BACKGROUND

Conventionally, fluid flow emanating from microchannel structures may be measured using a pitot tube. The pitot tube allows for a comparison of a total pressure of the fluid flow relative to the static pressure of the surrounding environment to determine a dynamic pressure. The dynamic pressure is then input into Bernoulli's equation to determine the velocity of the fluid flow.

However, pitot tubes have poor accuracy at low velocities due to the slight difference in pressure between the total pressure of the flow relative to the static pressure of the surrounding environment. The friction across a needle of the pitot tube causes too large of a pressure drop for the pitot tube to be accurate.

SUMMARY

In one embodiment, an apparatus for a fluid flow velocity measurement apparatus includes a pressure transducer and a flexible tube. The pressure transducer is tuned to measure flow speeds having a Reynolds number less than 100 and includes an inlet. The flexible tube has a first end fluidly coupled to the inlet and a second end positioned adjacent to and in fluid communication with a plurality of fluid outlets of a microchannel flow structure. Each of the plurality of fluid outlets has a cross section defining an outlet area. The second end has a cross section defining a flexible tube area that is larger than the outlet area.

In another embodiment, methods for measuring fluid flow velocity includes translating a flexible tube to be adjacent to and in fluid communication with a portion of a plurality of fluid outlets. Each of the plurality of fluid outlets have a cross section defining an outlet area. The flexible tube has a cross section defining a flexible tube area that is larger than the outlet area. The method further includes receiving a portion of the fluid flow by a pressure transducer via the flexible tube. The method further includes determining an experimental pressure of the portion of the fluid flow by a pressure transducer via the flexible tube. The method further includes applying a correction factor to the experimental pressure to determine a corrected pressure.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
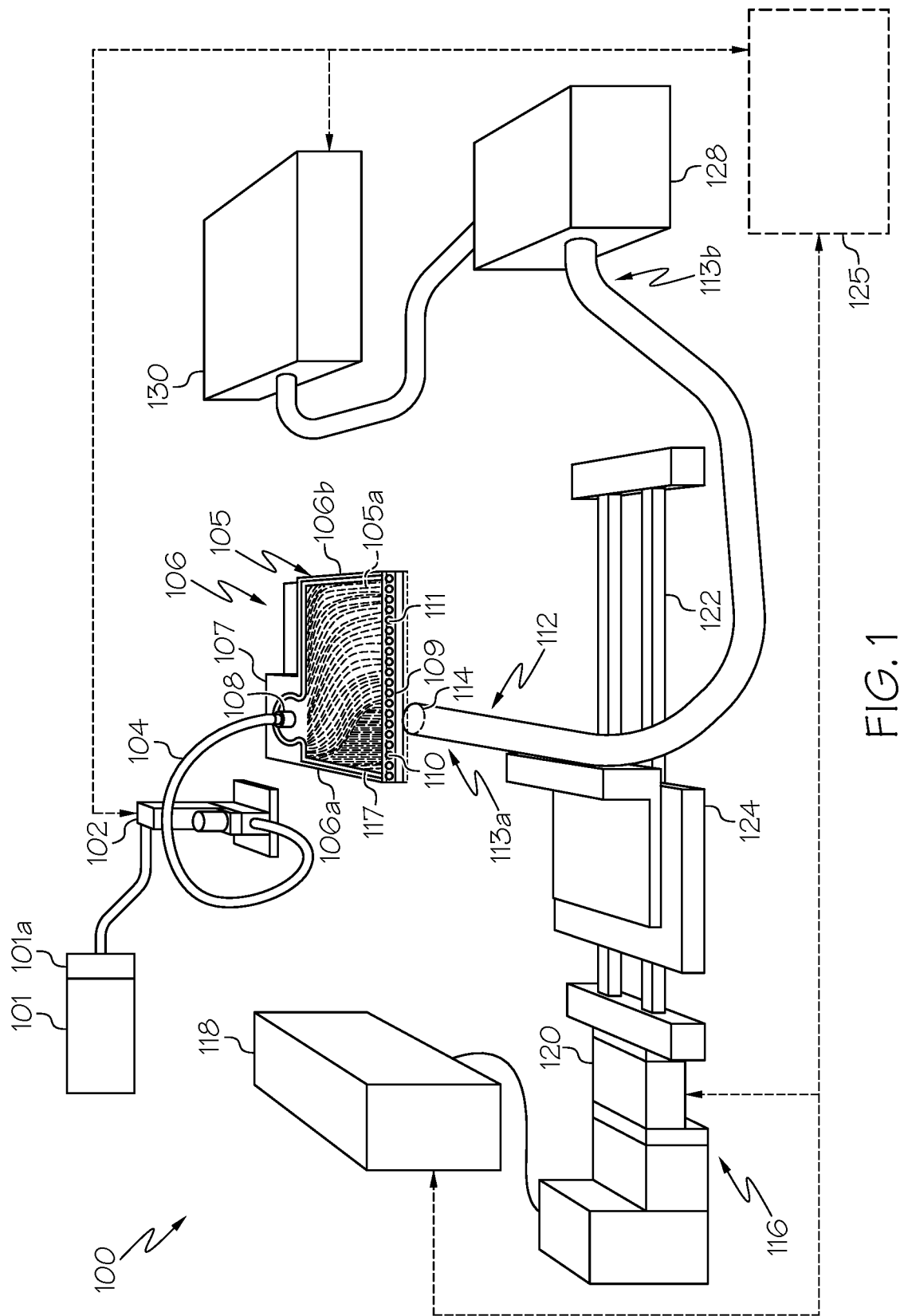
FIG. 1 schematically depicts an illustrative fluid flow speed measuring system, according to one or more embodiments shown and described herein.

Embodiments described herein are directed to a fluid flow speed measuring system that includes a flexible tube for the purposes of determining a corrected velocity of a low speed fluid flow emanating from jets of a microchannel flow structure. As discussed in greater detail herein, the flow measuring system determines the corrected velocity with high accuracy relative to other apparatuses (e.g., an apparatus employing a pitot tube) while also having low complexity and being cost-effective. Various embodiments of the method and apparatus and the operation of the method and apparatus are described in more detail herein. Whenever possible, the same reference numerals will be used throughout the drawings to refer to the same or like parts.

Referring now to FIG. 1, a fluid flow speed measuring system 100 is illustrated according to one or more embodiments described herein. As discussed in greater detail herein, the flow measuring system 100 is used to determine an experimentally-collected pressure, which is compared to a simulated model of the flow measuring system 100. This facilitates for a correction factor to be determined and applied to the experimentally-collected pressure. The flow measuring system 100 may be implemented in a production line of a component to determine the spray deposition on the component.

The flow measuring system 100 may generally include, for example, a flow meter 102, an input tube 104, a flexible tube 112, a pressure transducer 128, and/or a signal conditioner 130. In some embodiments, the flow measuring system 100 may further include a motor assembly 116, a power supply 118 powering the motor assembly 116, and/or a controller 125. The various components of the flow measuring system 100 described herein are generally used and configured to measure the microchannel flow structure 106, as will be described herein.

The flow meter 102 is generally a device that receives fluid flow for the fluid flow speed measuring system 100 from a fluid supply 101 (e.g., pump, compressor) having a valve 101a that controls the velocity and pressure of the fluid. The valve 101a may be a ball valve, a butterfly valve, a check valve, a gate valve or the like. The flow meter 102 measures the volumetric flow rate of the fluid from the fluid supply 101 before the fluid proceeds through other components of the fluid flow speed measuring system 100. In this way, the volumetric flow rate of the fluid can be configured by adjusting the valve 101a so that the fluid is within a specified range. The flow meter 102 may be a paddlewheel flow meter, a variable area flow meter, an ultrasonic Doppler flow meter, a positive displacement flow meter, or the like.

The fluid flow speed measuring system 100 is fluidly coupled to the microchannel flow structure 106 via an input tube 104 and is configured to receive fluid from the input tube 104. The input tube 104 is positioned between the flow meter 102 and the microchannel flow structure 106 and fluidly couples the input tube 104 to the flow meter 102. The microchannel flow structure 106 receives the fluid flow from the input tube 104 by a fluid inlet 108 of the microchannel flow structure 106. The fluid inlet 108 defines a cross-sectional inner diameter having an inlet area.

The microchannel flow structure 106 includes a body 105 having at least a first side 107 and a second side 109. The body 105 of the microchannel flow structure 106 defines a plurality of fluid channels 105a (e.g., microchannels), a fluid inlet 108, and a plurality of fluid outlets 110. The fluid channels 105a fluidly couple the fluid inlet 108 to the plurality of fluid outlets 110. That is, the fluid channels 105a are positioned between the fluid inlet 108 and the plurality of fluid outlets 110. As the fluid flow progresses through the microchannel flow structure 106, the fluid is directed by the plurality of fluid channels 105a through the body 105. It should be appreciated that the volume and/or velocity of the fluid flow that is directed by at least a portion of the plurality of fluid channels is dependent on a position of the fluid inlet 108 relative to plurality of fluid channels 105a and/or the plurality of fluid outlets 110. As illustrated in the embodiment of FIG. 1, the fluid inlet 108 is disposed on a third side 106a of the body 105 the microchannel flow structure 106. Accordingly, at least a portion of the plurality of fluid channels 105a and the plurality of fluid outlets 110 may also be disposed at or near the third side 106a of the body 105 of the microchannel flow structure 106 (e.g., positioned closer to the third side 106a of the body 105 of the microchannel flow structure 106 relative to a fourth side 106b) receive higher levels of fluid flow as compared to the fourth side 106b (e.g., axially opposed to the third side 106a) of the of the microchannel flow structure 106. Accordingly, the flexible tube 112 receives higher levels of fluid flow when adjacent to the third side 106a as compared to the fourth side 106b. In embodiments, the flow distribution of the microchannel flow structure 106 may be configured to provide high levels of fluid flow when adjacent to the fourth side 106b as compared to the third side 106a.

Figure 2:
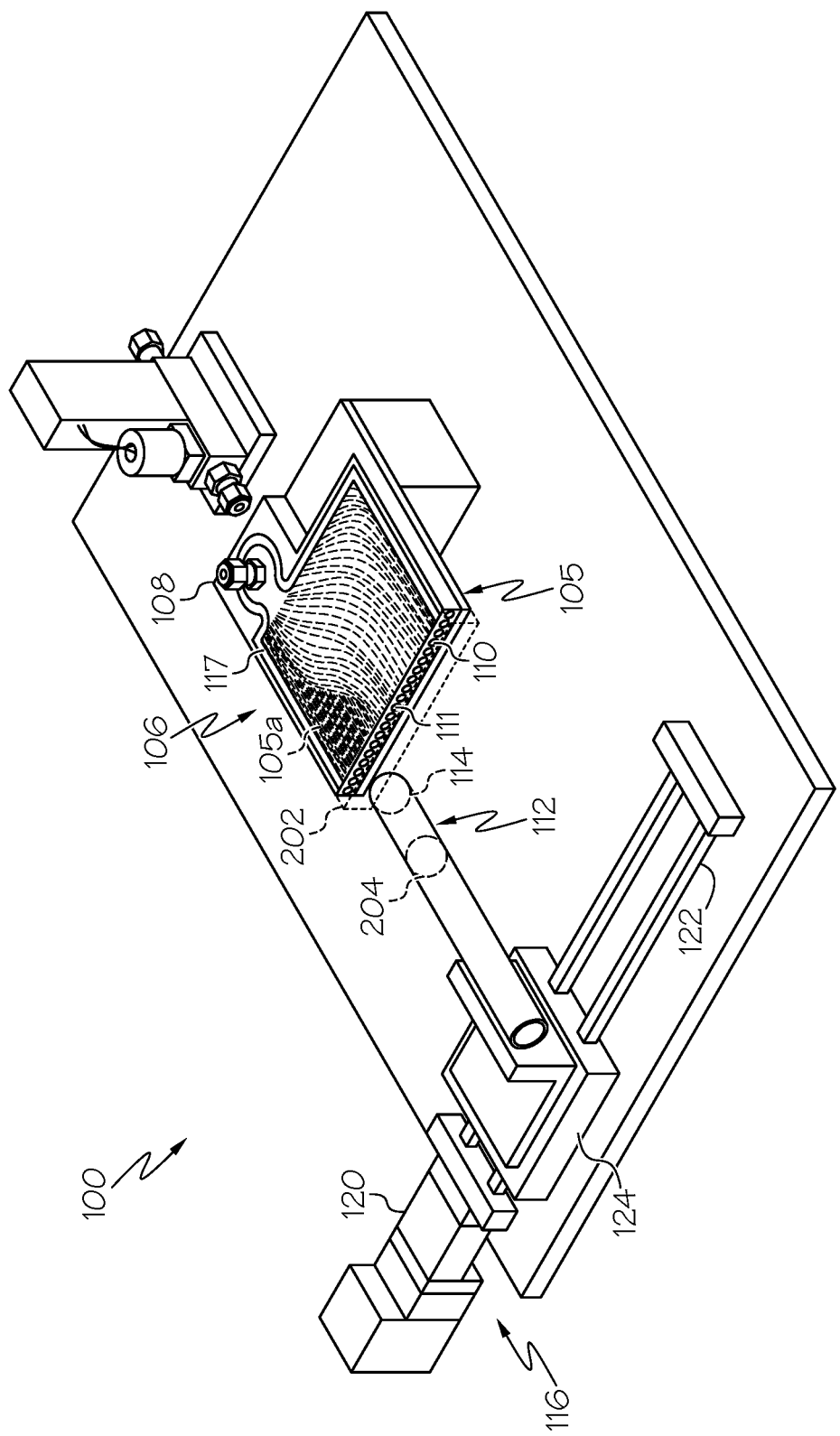
FIG. 2 schematically depicts the fluid flow speed measuring system of FIG. 1 with certain parts omitted for visualization purposes.

As illustrated in FIG. 2, each of the plurality of fluid outlets 110 define a cross-sectional inner diameter having an outlet area 111. In some embodiments, the microchannel flow structure 106 may include about 50 to about 150 fluid outlets 110. In some embodiments, the microchannel flow structure 106 may include about 25 to 50 fluid outlets 110. In some embodiments, the microchannel flow structure 106 may include about 100 to 250 fluid outlets 110.

The microchannel flow structure 106 further includes a seal 117 which extends along a portion of the body 105. The seal 117 prevents fluid flow which has entered the fluid inlet 108 from exiting the body 105 except through the plurality of fluid outlets 110.

In some embodiments, the plurality of fluid outlets 110 are in fluid communication with a secondary microchannel flow structure (not shown). In these embodiments, the secondary microchannel flow structure is positioned between the microchannel flow structure 106 and the flexible tube 112. The secondary microchannel flow structure has a plurality of inlets corresponding to the plurality of fluid outlets 110 and are in line with the plurality of fluid outlets 110. The secondary microchannel flow structure may be configured to alter the fluid. For example, the secondary microchannel flow structure may be utilized to perform a chemical reaction onto the fluid in the secondary microchannel flow structure.

In conventional systems, such as systems that employ pitot tubes or the like, the inner diameter of the tube is about 0.20 mm. For fluid flow having a Reynolds number less than 100, the pressure drop across the length of a needle of the pitot tube results in inaccurate measurements. This pressure drop is a result of the friction of the inner diameter tube being large relative to the low velocity speed of the fluid flow.

In contrast, the fluid flow speed measuring system 100 of the present disclosure includes a flexible tube 112 disposed between and fluidly coupled to at least a portion of the plurality of fluid outlets 110 and the pressure transducer 128. That is, a first end 113a of the flexible tube 112 is disposed at or near the plurality of fluid outlets 110 and a second end 113b of the flexible tube 112 is spaced a length apart from the first end 113a and is fluidly coupled to the pressure transducer 128. As discussed in greater detail herein, the flexible tube 112 defines a larger inner diameter when compared to tubes (e.g., pitot tubes) used in conventional systems. The larger diameter allows the flexible tube 112 to interact with a greater total pressure from the fluid emanating from the microchannel flow structure 106 relative to the tubes of conventional systems. By receiving a greater total pressure, the fluid flow speed measuring system 100 described herein can determine the average flow velocity over an aggregate of the fluid outlets 110. As discussed in greater detail herein, a correction factor for the total pressure may be determined to offset the impact of using the flexible tube 112 (e.g., tube friction, obstructing walls). By measuring an aggregate of the fluid outlets 110 and determining an average flow velocity as described herein, the fluid flow speed measuring system 100 is able to calculate low velocity flows (e.g., having a Reynolds number less than 100) that would otherwise not be possible using conventional systems (e.g., systems employing a pitot tube).

The flexible tube 112 may be constructed of a plastic material, an elastomer, silicone, a rubber-like material, or any material of the like having the ability to bend and/or compress at nominal forces without experiencing plastic deformation. By being constructed of a flexible material, the flexible tube 112 is able to flex when interfacing with the fluid flow and also to be translated during the measurement process.

The flexible tube 112 is separated from the plurality of fluid outlets 110 by a specified distance. In some embodiments, the flexible tube 112 is separated from (e.g., adjacent to) the plurality of fluid outlets 110 such that the first end 113a of the flexible tube 112 is spaced a distance of about 0.05 inches to about 0.1 inches. In some embodiments, the flexible tube 112 is separated from the plurality of fluid outlets 110 at a distance of about 0.1 inches to about 0.50 inches.

In some non-limiting embodiments, the tube area 114 is about 100 $mm^2$ and the outlet area 111 is about one-third to one-sixth in magnitude relative to the tube area 114. In some non-limiting embodiments, the tube area 114 is about 50 $mm^2$ and the outlet area 111 is about one-eighth to one-twenty-fifth in magnitude relative to the tube area 114. In some non-limiting embodiments, the tube area 114 is about 25 $mm^2$ and the outlet area 111 is about one-twentieth to one-fiftieth in magnitude relative to the tube area 114.

The fluid flow speed measuring system 100 further includes a motor assembly 116. The motor assembly 116 translates the flexible tube 112 relative to the microchannel flow structure 106 during the measurement process. That is, the motor assembly 116 causes lateral movement of the first end 113a of the flexible tube 112 relative to the microchannel flow structure 106 such that the first end 113a is aligned with a portion of the plurality of fluid outlets 110 at any given point. During the measurement process, fluid exiting a portion of the plurality of fluid outlets 110 and into the flexible tube 112 is measured. The portions may have overlapping plurality of fluid outlets 110 (e.g., different portions share some of the same plurality of fluid outlets 110 similar to a moving average). Further, the same portion may be measured more than once. The motor assembly 116 translates the flexible tube 112 so that it receives fluid flow from varying portions of the plurality of fluid outlets 110. The motor assembly 116 translates the flexible tube 112 in discrete steps to obtain the experimental measurements across each designated portion of the plurality of fluid outlets 110.

The motor assembly 116 includes a power supply 118 and a motor 120. The power supply 118 is electrically coupled to the motor 120 and is configured to provide electricity to the motor 120. The motor assembly 116 further includes a motor track 122 operatively coupled to the motor 120 and a platform 124 positioned on the motor track 122. In response to the operation of the motor 120, the motor track 122 repositions the platform 124. In other words, the platform 124 moves back and forth along a length of the motor track 122 by the motor 120.

The flexible tube 112 is coupled to the platform 124. In response to the movement of the platform 124, the flexible tube 112 is also configured to move. In this way, the flexible tube 112 translates along the width of the microchannel flow structure 106 when the fluid flow speed measuring system 100 measures flow across the portions of the plurality of fluid outlets 110.

The motor 120 is communicatively coupled to a controller 125. The controller 125 may be a control device as is generally understood, and may include processing components such as, for example, a central processing unit (CPU), an electronic control unit (ECU), a digital signal processor (DSP) or the like. During the measurement process, the flexible tube 112 receives a pressure from the fluid flow from a first portion of the plurality of fluid outlets 110. The velocity of the fluid flow is then determined for a first discrete step of the measurement process. The controller 125 provides a signal to the motor 120 indicative of the distance the flexible tube 112 is to be translated. This distance correlates to a movement of the flexible tube 112 from the first portion of the plurality of fluid outlets 110 to a second set of the plurality of fluid outlets 110. The velocity of the fluid flow from the second portion of the plurality of fluid outlets 110 is determined for a second discrete step of the measurement process. As will be described in further detail hereinbelow, the controller 125 may also be communicatively coupled to the flow meter 102, the power supply 118, and/or any other component of the fluid flow speed measuring system 100 for the purposes of controlling portions of the flow measuring system 100, receiving measurements, determining flow, and/or outputting results.

The fluid flow speed measuring system 100 further includes a pressure transducer 128 (e.g., absolute pressure transducer, gauge pressure transducer, differential pressure transducer) having an inlet configured to receive fluid flow from the second end 113*b*. The pressure transducer 128 converts pressure of the received fluid flow into an analog electrical signal. In some embodiments, the pressure transducer may be particularly tuned for flow speeds having a Reynolds number that is less than 100.

The fluid flow speed measuring system 100 further includes a signal conditioner 130 communicatively coupled to the pressure transducer 128. The pressure transducer 128 provides the electrical signal to the signal conditioner 130. The signal conditioner 130 converts the electrical signal to determine an experimental pressure of the received fluid flow (e.g., the pressure of the received fluid flow from the second end 113*b*). The signal conditioner 130 is communicatively coupled to the controller 125 and is configured to provide the experimental pressure of the received fluid flow to the controller 125. The controller 125 receives the experimental pressure of the received fluid flow for each discrete step of the measurement process. Using this information, the controller 125 calculates the aggregated average differential pressures of the received fluid flow, as described herein with respect to FIG. 3.

Referring now to FIG. 2, the fluid flow speed measuring system 100 of FIG. 1 is shown at a perspective angle with certain components omitted. As shown in FIG. 2, the microchannel flow structure 106 defines an outlet measuring position 202. As discussed in greater detail herein, the outlet measuring position 202 is a position in which differential pressure values are measured for the microchannel flow structure 106. As discussed in greater detail herein, the differential pressure values are adjusted using a correction factor for the fluid flow speed measuring system 100.

The flexible tube 112 further defines a tube measuring position 204. The tube measuring position 204 is a selected position along the length of the flexible tube 112 in which a pressure of the fluid flow is measured within the flexible tube 112. As discussed in greater detail herein, the pressure is used to determine a correction factor for the fluid flow speed measuring system 100.

Figure 3:
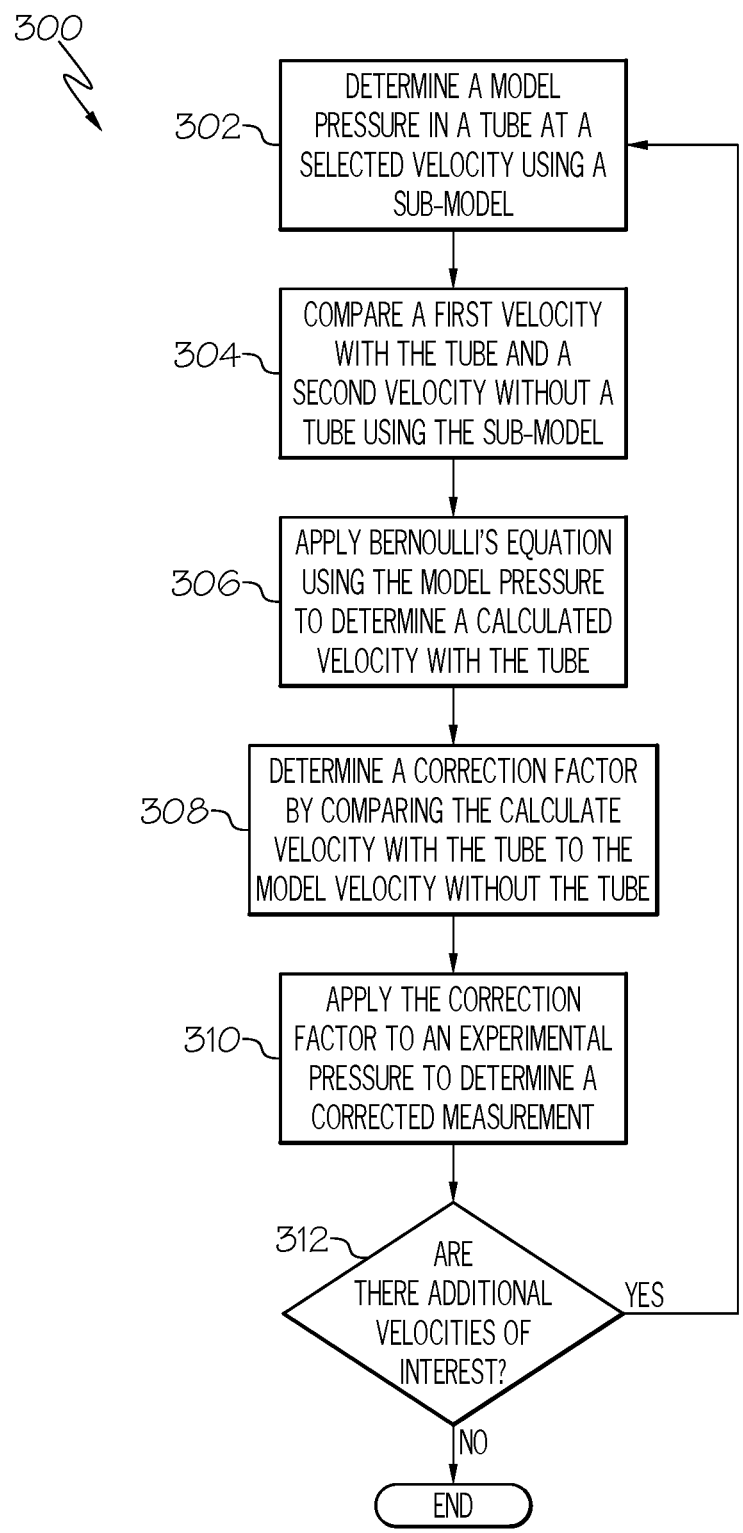
FIG. 3 schematically depicts a flow diagram of an illustrative method for determining a flow velocity in a flow measuring system, according to one or more embodiments shown and described herein.

As shown in FIG. 3, a method 300 for determining a flow velocity in a flow measuring system (e.g., such as the fluid flow speed measuring system 100) is shown, by any device or system configured, programmed, or the like to carry out the steps described herein, such as, for example, the controller 125 described herein with respect to FIG. 1.

At step 302, a fluid flow finite element analysis (FEA) sub-model of the flow measuring system is simulated at a selected velocity. The sub-model has a uniform fluid velocity across a plurality of fluid outlets (e.g., such as the plurality of fluid outlets 110). A model pressure is determined at a tube measuring position (e.g., such as tube measuring position 204) of a flexible tube (e.g., such as the flexible tube 112). The model pressure is determined in order to determine the effect of the flexible tube upon the flow velocity in the flow measuring system.

At step 304, using the same sub-model with the flexible tube, a first velocity is determined at an outlet measuring position (e.g., such as the outlet measuring position 202) across a cut-line (e.g., a line on a plane extending along a center point of each of the plurality of fluid outlets). The same sub-model is used without the flexible tube to determine a second velocity. The second velocity is also determined at the outlet measuring position across the cut-line. The second velocity is determined in order to determine a reference of the sub-model without the interference of the flexible tube. The second velocity is compared to the first velocity to determine the effect of the tube on the fluid flow field.

At step 306, Bernoulli's equation is applied using the model pressure with the tube from step 302 to determine a calculated velocity. In the application of Bernoulli's equation, a static pressure is set to zero. Additionally, a density of the flowing fluid is the density of atmospheric air.

$$v_c = \sqrt{\frac{2}{\rho}(p_m - p_s)}$$

Due to the fluid flow having a low velocity, the fluid flow recirculates and creates eddy currents. This results in an invalidation of the Bernoulli equation. Accordingly, a correction factor is determined in order to correct any experimental data collected. At step 308, the correction factor for the selected velocity is determined. The correction factor is dependent on the selected velocity and the configuration of the flow measuring system used (e.g., the size of the flexible tube and the configuration of the microchannel flow structure).

The calculated velocity from step 306 and the model pressure from 302 are used in determining the correction factor, as shown below. In the application of determining the correction factor, the static pressure is set to zero. Additionally, the density of the flowing fluid is the density of atmospheric air. Specifically, the corrector factor $C_f$ is determined by adjusting it such that the model velocity prediction using Bernoulli's equation with the tube matches the model velocity prediction at the cut line without the tube.

$$v_c = \sqrt{\frac{2}{\rho}C_f(p_m - p_s)}$$

At step 310, the physical flow measuring system with the flexible tube is utilized at the selected velocity. The flexible tube is placed upon a platform (e.g., such as the platform 124) upon a motor track (e.g., such as motor track 122) operatively coupled to a motor (e.g. such as the motor 120). The flexible tube translates along a width of the flow measuring system at the outlet measuring position. The flexible tube receives fluid flow from a first portion of the plurality of fluid outlets, wherein a first differential pressure is measured. The flexible tube is moved to a second portion of the plurality of fluid outlets, wherein a second pressure is measured. The second portion of the plurality of fluid outlets may overlap with the first portion of the plurality of fluid outlets. In some embodiments, a total of ten to twenty-five portions are tested to determine their pressures. In some embodiments, a total of twenty-five to one hundred portions are tested to determine their pressures. In some embodiments, a total of one hundred to five hundred portions are tested to determine their pressures.

After determining the pressures from each portion, the correction factor of step 308 is applied using the experimental pressure to obtain a corrected measurement value. The corrected measurement value is used to determine a corrected flow velocity of the fluid flow in the flow measuring system.

At step 312, it is determined whether there are different velocities of interest (e.g., different selected velocities). If there are different velocities of interest, the process returns to step 302. The method 300 is repeated to determine a correction factor at a second selected velocity. If there are not different velocities of interest, the method 300 is completed.

From the above, it is to be appreciated that defined herein is a flow measuring system that includes microchannel flow structure and a flexible tube in order to determine a corrected velocity of a low speed fluid flow. As discussed in greater detail above, the flow measuring system determines the corrected velocity with high accuracy while having low complexity and being cost-effective.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A fluid flow velocity measurement apparatus, comprising:
    a flexible tube having an open end in fluid communication with a plurality of fluid outlets of a microchannel flow structure, each of the plurality of fluid outlets having a cross section defining an outlet area, the open end having a cross section defining a flexible tube area that is larger than the outlet area of each fluid outlet;
    a pressure transducer tuned to measure fluid speeds having a Reynolds number less than 100 and having an inlet fluidly coupled to the flexible tube such that fluid flowing from the plurality of fluid outlets are captured by the pressure transducer and a signal corresponding to a pressure of the fluid is generated; and
    a controller configured to receive an experimental pressure value generated as a result of the signal generated by the pressure transducer, determine an aggregated average differential pressure of the fluid, and calculate a corrected flow velocity of the fluid based on the aggregated average differential pressure by:
        determining a fluid velocity of the fluid at an outlet measuring portion,
        applying Bernoulli's equation using a model pressure to determine a calculated velocity,
        determining a correction factor based on the fluid velocity and the calculated velocity, and
        applying the correction factor to the experimental pressure value.

2. The apparatus of claim 1, wherein the flexible tube area is between three to six times larger in size than the outlet area.

3. The apparatus of claim 1, wherein the flexible tube area is between ten to twenty times larger in size than the outlet area.

4. The apparatus of claim 1, further comprising a flow meter in fluid communication with the microchannel flow structure.

5. The apparatus of claim 1, further comprising a signal conditioner communicatively coupled to the pressure transducer, the signal conditioner configured to receive the signal from the pressure transducer, generate the experimental pressure value from the signal, and transmit the experimental pressure value to the controller.

6. The apparatus of claim 1, further comprising:
a motor;
a motor track operatively coupled to the motor; and
a platform coupled to the flexible tube and movably positionable on the motor track,
wherein the open end of the flexible tube aligns with one or more portions of the plurality of fluid outlets when the platform is moved by the motor along the motor track.

7. A method for measuring fluid flow velocity, comprising:
translating a flexible tube to be adjacent to and in fluid communication with a portion of a plurality of fluid outlets, each one of the plurality of fluid outlets having a cross section defining an outlet area, the flexible tube having a cross section defining a flexible tube area that is larger than the outlet area of each fluid outlet;
receiving, via a pressure transducer tuned to measure fluid speeds having a Reynolds number less than 100, a portion of a fluid flow from the portion of the plurality of fluid outlets via the flexible tube;
generating, by the pressure transducer, a signal corresponding to a pressure of the fluid;
determining, by a controller, an experimental pressure value of the portion of the fluid flow based on the signal;
determining, by the controller, an aggregated average differential pressure of the fluid; and
calculating, by the controller, a corrected flow velocity of the fluid flow based on the aggregated average differential pressure by:
determining a fluid velocity of the fluid at an outlet measuring portion,
applying Bernoulli's equation using a model pressure to determine a calculated velocity,
determining a correction factor based on the fluid velocity and the calculated velocity, and
applying the correction factor to the experimental pressure value.

8. The method of claim 7, further comprising translating the flexible tube to be in fluid communication with a second portion of the plurality of fluid outlets;
receiving a second portion of the fluid flow from the second portion of the plurality of fluid outlets; and
determining a second experimental pressure of the second portion of the fluid flow by the pressure transducer via the flexible tube.

\* \* \* \* \*